United States Patent [19]

Kuribayashi

[11] Patent Number: 5,121,375
[45] Date of Patent: Jun. 9, 1992

[54] INFORMATION-RECORDED DISK CARRYING TRACKING PILOT SIGNAL AND PLAYING APPARATUS THEREFOR

[75] Inventor: Hiroki Kuribayashi, Saitama, Japan

[73] Assignee: Pioneer Electronic Corporation, Tokyo, Japan

[21] Appl. No.: 567,506

[22] Filed: Aug. 15, 1990

[30] Foreign Application Priority Data

Dec. 21, 1989 [JP] Japan .................................. 1-331586

[51] Int. Cl.[5] .............................................. G11B 7/00
[52] U.S. Cl. ............................ 369/44.37; 369/44.26; 369/44.35; 369/47; 250/201.5
[58] Field of Search ............... 369/44.25, 44.26, 44.29, 369/44.35, 44.37, 44.41, 44.36, 44.38, 44.39, 275.3, 275.1, 61, 47, 44.11, 109-111, 32, 124; 250/201-205; 358/342

[56] References Cited

U.S. PATENT DOCUMENTS

| | | | |
|---|---|---|---|
| 4,404,599 | 9/1983 | Kinjo et al. | 369/109 |
| 4,569,038 | 2/1986 | Nagashima et al. | 369/44.26 |
| 4,660,191 | 4/1987 | Maeda et al. | 369/44.35 |
| 4,744,070 | 5/1988 | Takemura et al. | 369/44.26 |
| 4,750,162 | 6/1988 | Tajima | 369/44.37 |
| 4,875,203 | 10/1989 | Nagashima et al. | 369/44.25 |

OTHER PUBLICATIONS

Patent Abstracts of Japan, vol. 7, No. 105 (P-195)(1250) May 7, 1983 (JPA 58-26369).
Patent Abstracts of Japan, vol. 6, No. 116 (P-125)(994) Jun. 29, 1982 (JPA 57-44238).

*Primary Examiner*—Roy N. Envall, Jr.
*Assistant Examiner*—Thang V. Tran
*Attorney, Agent, or Firm*—Sughrue, Mion, Zinn Macpeak & Seas

[57] ABSTRACT

A tracking error detector circuit to maintain correct disk tracking on high density disks provided within an apparatus for playing a prerecorded disk. The disk contains two carrier signals with frequencies $f_1$ and $f_2$, which are alternately superimposed onto an information signal each rotation of the prerecorded disk. The tracking error detection circuit includes circuitry to determine, as a first error signal, the difference in amplitude between the $f_1$ frequency components of the tracking sub-beams, and between $f_2$ frequency components of the tracking sub-beams. The detection circuit further includes a sensor to detect one rotation of the prerecorded disk and a selection circuit, which alternately selects the first and second error signals each time the rotation sensor detects a disk revolution. This selected error signal acts as the tracking error signal for the succeeding revolution of the disk.

6 Claims, 5 Drawing Sheets

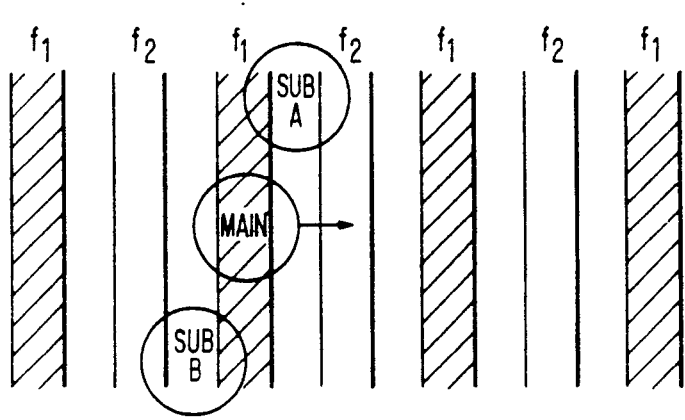
FIG. 4(F)
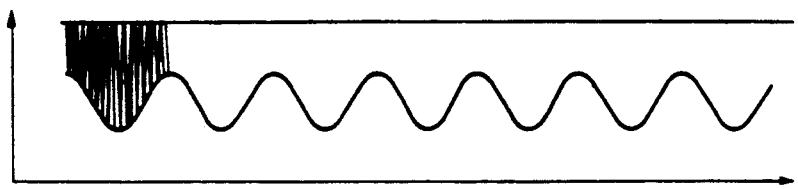
FIG. 4(A) RF
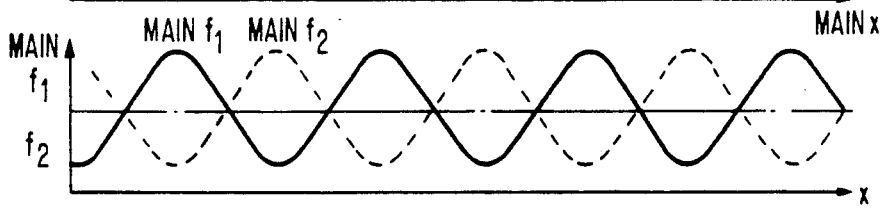
FIG. 4(B)
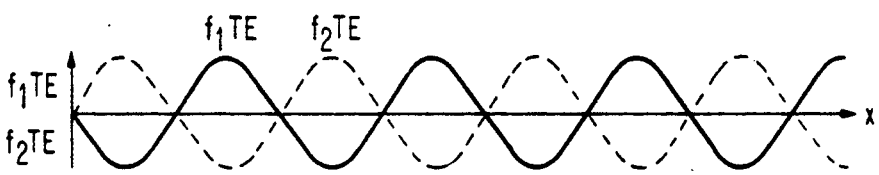
FIG. 4(C) $f_1 TE$ / $f_2 TE$
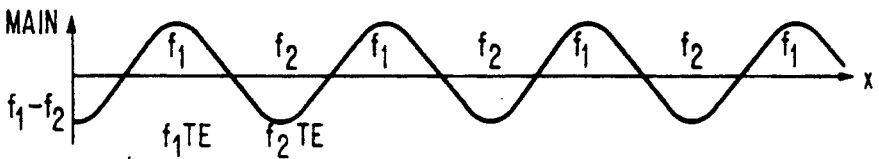
FIG. 4(D) MAIN $f_1-f_2$
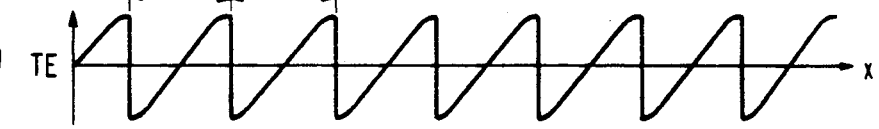
FIG. 4(E) TE FIG. 5
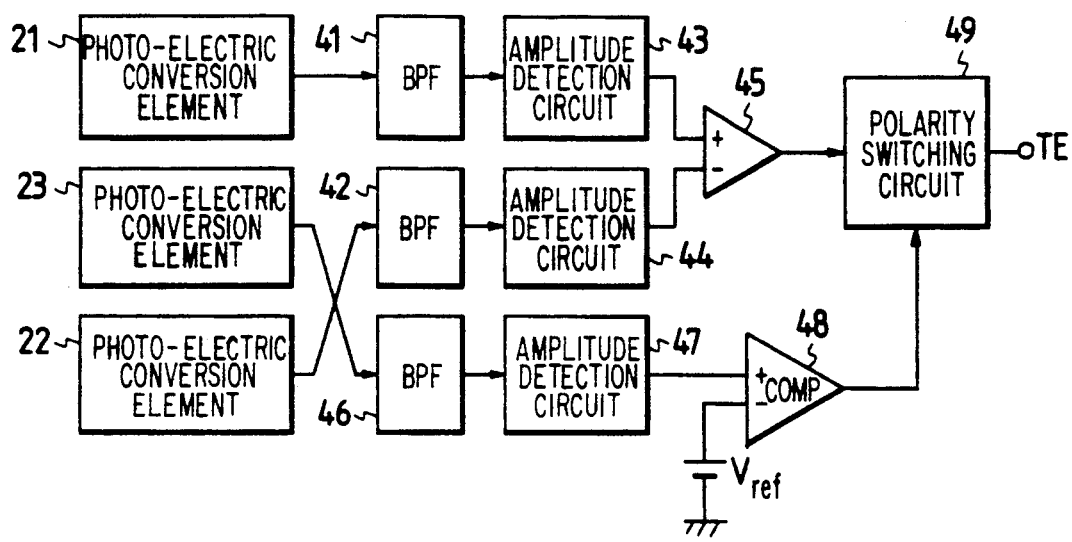
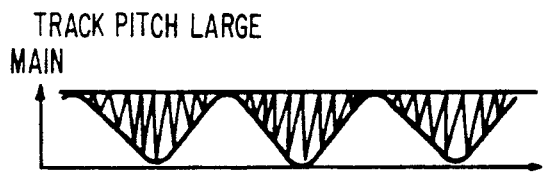
FIG. 7(A)
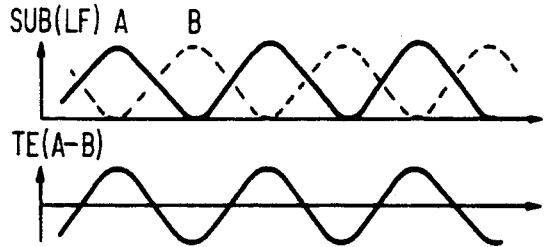
FIG. 7(B)
FIG. 7(C)
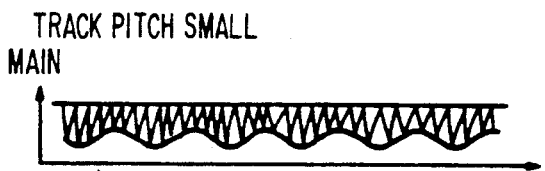
FIG. 8(A)
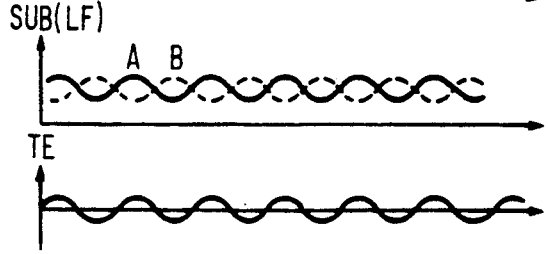
FIG. 8(B)
FIG. 8(C)

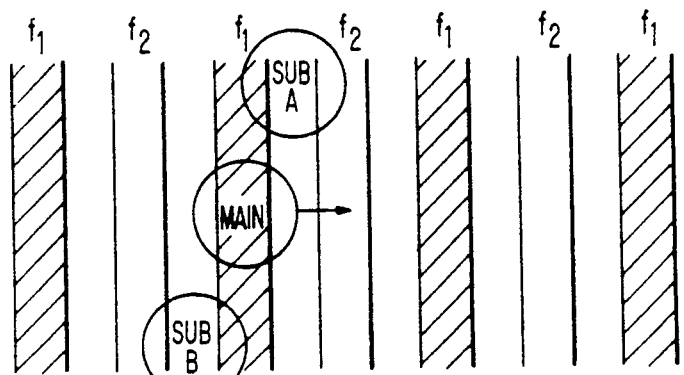
FIG. 6(F)
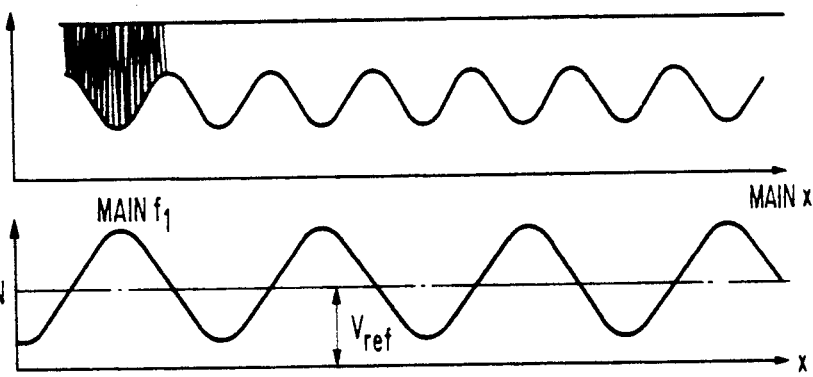
FIG. 6(A) RF
FIG. 6(B) MAIN
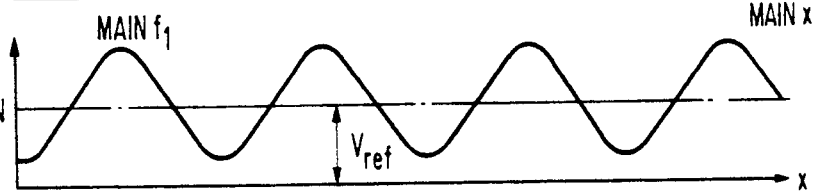
FIG. 6(C) $f_1$ TE
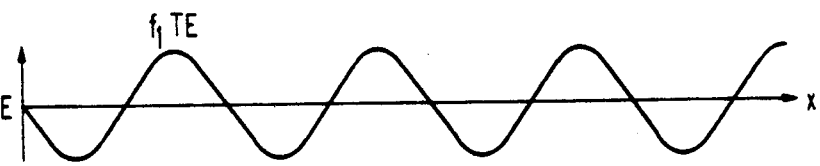
FIG. 6(D) COMP OUT
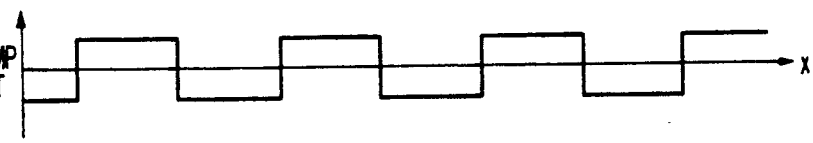
FIG. 6(E) TE
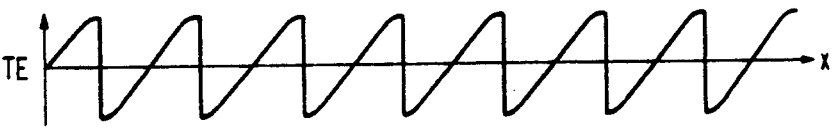

INFORMATION-RECORDED DISK CARRYING TRACKING PILOT SIGNAL AND PLAYING APPARATUS THEREFOR

TECHNICAL FIELD

The present invention relates to the use of information-recorded disk tracking carrier signals, and a playing apparatus therefor. More specifically, it relates to a tracking error detection circuit in an information-recorded disk playing apparatus.

BACKGROUND TECHNIQUE

Optical disk players used to play video disk, digital audio disk, etc., often experience difficulty following prerecorded tracks of information upon the disk, primarily when these tracks deviate from their standard path. To correct this tracking problem, disc players include a tracking servo apparatus, which includes a three-beam tracking system. More specifically, the three beam system includes a main central beam for reading prerecorded information and two tracking detector sub-beams arranged to precede and succeed the main beam, respectively, as the main beam moves perpendicular to the direction of disc rotation. Tracking sub-beams generate outputs A and B, which includes any disk information picked up by the sub-beams and represents their positions relative to the track intended to be read by the main beam. These three beams also lie along a line connecting the optical axes of each beam whereby the connecting line has a predetermined offset angle relative to a line tangential to the direction of disk rotation. A tracking error signal TE is generated from a difference (A−B) between the low frequency components, of outputs A and B generated by the tracking sub-beams. This error signal is then used to correctly position the main beam over a desired track.

Recently, however, technological advances allow denser information storage on each disk, which causes the pitch of recording tracks to becomes narrower. Hence, the conventional tracking error detector circuit is unable to distinguish between light and a dark (i.e., the change in the amplitude of an RF signal) when the sub-beams cross tracks. Consequently, an adequate tracking error signal cannot be generated and tracking servo integrity cannot be maintained. FIGS. 7(a)-7(c) show waveforms read from a disk in which the track pitch is large and FIGS. 8(a)-8(c) show waveforms from a disk in which the track pitch is small. FIGS. 7(a) and 8(a) show the main RF signal as the servo apparatus is moved radially across the disk. FIG. 7(b) and 8(b) show outputs A and B from tracking sub-beams moved in a similar radial motion, and FIG. 7(c) and 8(c) show respective error signals TE. It is apparent from FIG. 8(c) that small track pitch creates an error signal TE amplitude to small to correctly control the tracking servo apparatus.

SUMMARY OF THE INVENTION

It is therefore an object of the present invention to provide a tracking error detection circuit which generates a tracking error signal amplitude large enough to control the tracking servo, especially when track pitch is small.

In the present invention, a tracking error detector circuit is provided in an apparatus for playing an prerecorded disk. The disk contains two carrier signals with frequencies $f_1$ and $f_2$, which are alternately superimposed onto an information signal each rotation of the prerecorded disk. This system uses frequency multiplexing to record the carrier signals and information signal onto the disk. The tracking error detection circuit includes circuitry to determine, as a first error signal, the difference in amplitude between the f1 frequency components of the tracking sub-beams, and as a second error signal, the difference in amplitude between $f_2$ frequency components of the tracking sub-beams. The detection circuit further includes a sensor to detect one rotation of the prerecorded disk and a selection circuit, which alternately selects the first and second error signals each time the rotation sensor detects a disk revolution. This selected error signal acts as the tracking error signal for the succeeding revolution of the disk.

In another embodiment, the present invention constitutes a tracking error detector circuit provided in an apparatus for playing an prerecorded disk, which includes one carrier signal having frequency f1 superimposed onto every other track of the information signal of the prerecorded disk by frequency multiplexing. Frequency multiplexing allows the carrier signal to be recorded with every other track of information on the disk. The tracking error detection circuit determines, as an error signal, the difference in amplitude between the carrier signal f1 components picked up by the tracking sub-beams. This difference is feed into a polarity switching circuit, which outputs the error tracking signal f1TE. In addition, the detection circuit includes a comparitor, which compares a reference voltage to the carrier signal component f1 of the main beam signal, provided the track picked up by the main beam includes a carrier signal. The comparator output functions as a switching control for the polarity switching circuit, thereby switching the polarity of the tracking error signal every disk revolution.

BRIEF DESCRIPTION OF THE DRAWINGS

FIG. 4, consisting of 4(A)-4(E), is a view showing signal waveforms with respect to recording tracks, for explaining the operation of the circuit shown in FIG. 3;

FIG. 5 is a block diagram showing another embodiment of the tracking error detection circuit according to the present invention;

FIG. 6 consisting of 6(A)-6(E) is a view showing signal waveforms with respect to recording tracks, for explaining the operation of the circuit shown in FIG. 5;

FIG. 7, consisting of 7(A)-7(C), is a view showing waveforms of an RF signal (a) in the case where a track pitch is large, outputs A and B (b) detected on the basis of a pair of sub-beam stops respectively, and (c) a tracking error signal TE; and FIG. 8, consisting of 8(A)-8(C), is a view showing waveforms of an RF signal (a) in the case where the tracking pitch is small, outputs A and B (b) detected on the basis of a pair of the sub-beam spots respectively, and (c) a tracking error signal TE.

DETAILED DESCRIPTION OF THE PREFERRED EMBODIMENT

Figure 1:
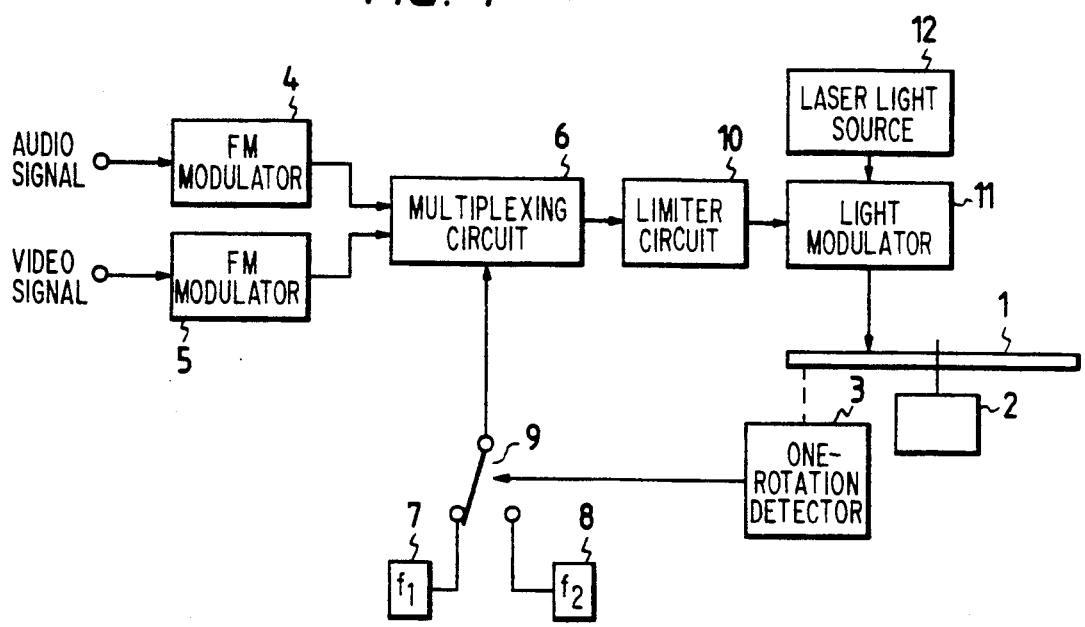
FIG. 1 is a block diagram showing an example of a recording system for a disk to which the present invention is applied.

Referring to the drawings, embodiments of the present invention will be described hereunder.

FIG. 1 is a block diagram showing an example of a record system to which the present invention is applied. In FIG. 1, the master disk 1 is rotated by an electric motor and information signals, such as audio and video signals are recorded thereon. While the master disk 1 rotates, a rotation detector 3 senses when the disk completes each revolution. The rotation detector 3 is made of a well-known sensor combination such as a reflecting mirror and a photo-reflector.

Figure 2:
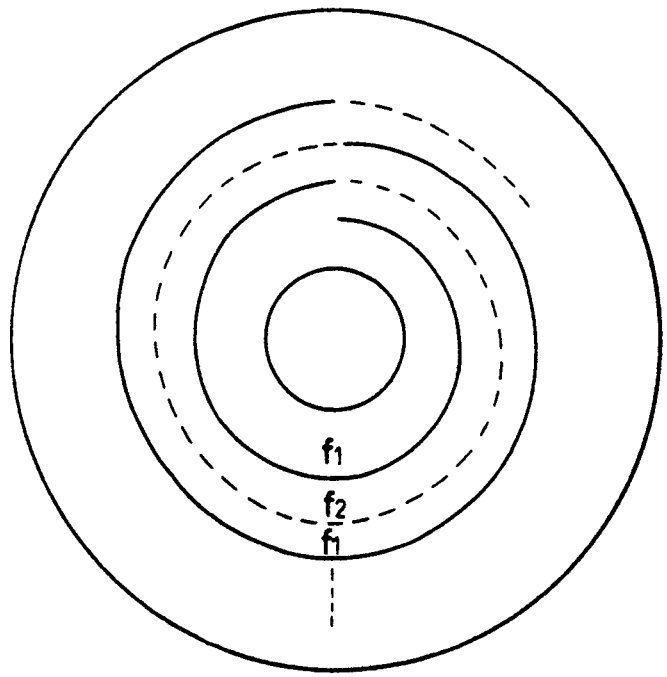
FIG. 2 is a view showing the relation between carrier signals $f_1$ and $f_2$ on recording tracks of a disk recorded by the recording system of FIG. 1.

The two-channel audio and video signals are modulated by FM modulators 4 and 5 into an audio FM modulated wave and a video FM modulated wave, respectively. Both the modulated waves are subjected to frequency multiplexing by circuit 6. During which, oscillators 7 and 8 generate carrier signals having frequencies $f_1$ and $f_2$ wherein both frequencies are within a predetermined band outside the frequency band used for recorded audio and video information signals. Next, carrier signals $f_1$ and $f_2$ are supplied to a selection switch 9. The selection switch 9 alternately selects carrier signals $f_1$ and $f_2$ every time the rotation detector 3 senses the disk has completed a revolution. The selected carrier signal $f_1$ or $f_2$ is supplied to the multiplexing circuit 6 and the subjected to frequency-multiplexing with the audio and video information signal. The multiplexed signal is limited in amplitude by a limiter circuit 10 and then supplied to a light modulator 11, which turns a laser beam emitted from a laser light source 12 on and off. The laser beam illuminates a photo-resist surface of the master disk 1 so that pits (exposed portions) representing recorded information are burnt into the photo-resist surface. The disk 1 is made to function as a master disk (recorded original disk) throughout developing treatment. Any disk obtained from this master disk, as shown in FIG. 2, also include the carrier signals f1 (the solid line) and f2 (the dashed line), recorded on adjacent tracks, within the information signal.

Figure 3:
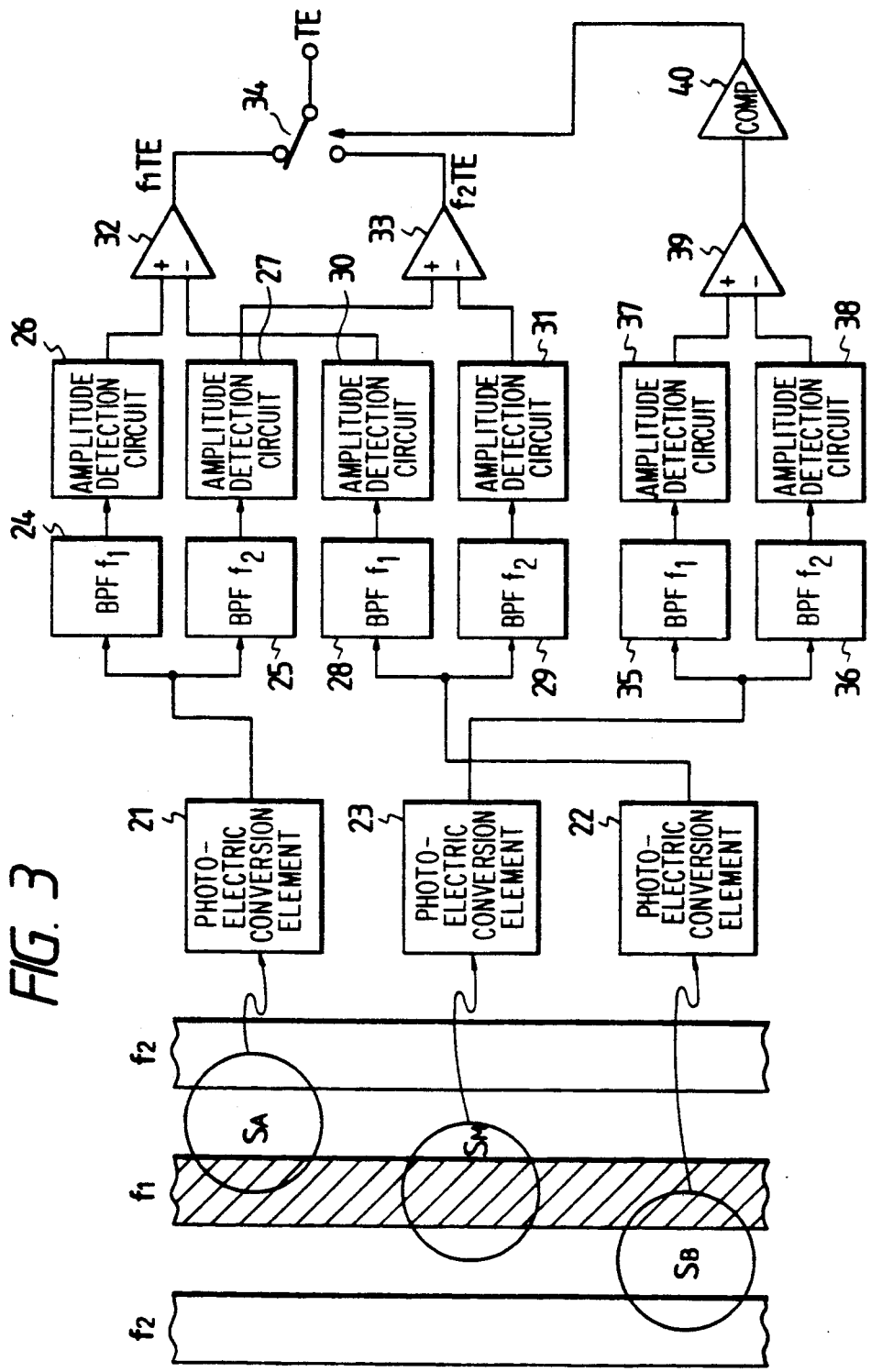
FIG. 3 is a block diagram showing an embodiment of the tracking error detection circuit according to the present invention.

Referring to a block diagram of FIG. 3, an embodiment of the tracking error detector circuit according to the present invention for use in an apparatus for playing prerecorded disk will be described hereafter. In FIG. 3, three laser beams are radiated onto the disk's prerecorded tracks to read each track. The beams include a main laser $S_M$ for reading prerecorded information, and two detector sub-beams SA and SB for monitoring the actual position of main beam SM relative its desired position. Sub-beams SA and SB are arranged to precede and succeed the main beam SM as it moves perpendicular to the direction of rotation of the disk (i.e. radially). In addition, all three beams are aligned in a relationship such that a line connecting the optical axes of the beams SM, SA and SB has a predetermined offset angle relative to the tangential direction of rotation of the tracks as shown in FIG. 3. The beams $S_A$, $S_B$ and $S_M$ reflected off the disk surface are incident respectively into photoelectric conversion elements 21, 22 and 23 provided within the pickup.

An output of the photoelectric conversion element 21, generated by sub-beam $S_A$, is supplied to a pair of BPFs (band pass filters) 24 and 25. The BPFs 24 and 25 have passing bands corresponding to the frequencies of the carrier signals $f_1$ and $f_2$, respectively. The components of the carrier signals $f_1$ and $f_2$ passed through the BPFs 24 and 25, respectively, are amplitude-detected by amplitude detection circuits 26 and 27. Similarly, an output of the photoelectric conversion element 22, generated by sub-beam $S_B$, is supplied to a pair of BPFs 28 and 29 having passing bands corresponding to the respective frequencies of the carrier signals $f_1$ and $f_2$. The components of the carrier signals $f_1$ and $f_2$ passed through the BPFs 28 and 29, respectively, are amplitude-detected by amplitude detection circuits 30 and 32. A difference between the outputs of the amplitude detection circuits 26 and 30, is derived as a first error signal $f_1TE$ by means of a differential amplifier 32, while a difference between the outputs of the amplitude detector circuits 27 and 31, is derived as a second error signal $F_2TE$ by means of a differential amplifier 33. The first and second error signals are supplied to a selection switch 34, in which one of the two error signals is selected and outputted as a tracking error signal TE.

On the other hand, an output of the photoelectric element 23, generated by the main beam $S_M$, is supplied as an RF signal to a demodulating system and simultaneously supplied to a pair of BPFs 35 and 36 having passing bands corresponding to the respective frequencies of the carrier signals $f_1$ and $f_2$. The components of the signals $f_1$ and $f_2$ passed through the BPFs 35 and 35, respectively, are amplitude-detected by amplitude detection circuits 37 and 38. Then, a difference between signal amplitudes is generated by a differential amplifier 39 and supplied to a comparator 40, which compares amplifier 39's output to a zero level reference input. The output of the comparator 40 is supplied, as a switch control signal, to the selection switch 34, wherein this output's polarity indicates which prerecorded track the main beam $S_M$ is positioned above. In referencing above, it is noted that the carrier signal multiplexed within the prerecorded audio and video information signal alternates between $f_1$ and $f_2$ each revolution of the disk. This carrier signal alternation causes the output of comparator 40 to change polarity, thus indicating the disk has completed a revolution.

Although the above description has set forth that one rotation of the disk is detected by comparing the respective amplitudes of the components of the signals $f_1$ and $f_2$, the present invention is not limited to this embodiment. For example, it is possible that a synchronizing signal is previously recorded every rotation of a disk so that the synchronizing signal is detected from the output of the main beam $S_M$.

Referring to a waveform diagram of FIG. 4, the operation of the circuit arrangement of FIG. 3 will be described hereunder.

FIG. 4 (a) illustrates when the main beam $S_M$ crosses recording tracks at a constant speed in the radial direction of the disk. Consequently, an RF signal is output from the photoelectric conversion element 23 based on the signal picked up by main beam $S_M$. The amplitudes of the respective components of the carrier signals $f_1$ and $f_2$ (which are the outputs of the amplitude detection circuits 37 and 38) change as shown in FIG. 4(B), and the first and second error signals $f_1TE$ and $f_2TE$ (which are the outputs of the differential amplifiers 32 and 33) vary as shown in FIG. 4(C). As a result, a difference signal, as shown in FIG. 4(D) is obtained as the output of the differential amplifier 39, so that the first error signal f1TE is selected, as output TE, in the period in which difference signal (f1-f2) is positive and second error signal f2TE is selected, as output TE, in the period in which difference signal (f1-f2) is negative. Accordingly, the tracking error signal TE as shown in FIG. 4(E) is obtained.

Tracking servo is based on the tracking error signal TE, such that the position of the main beam $S_M$, along the disk radius, is controlled to zero the amplitude of difference signals f1TE and f2TE. By adjusting the tracking servo to maintain zero amplitude signals f1TE and f2TE, the main beam $S_M$ is centered on the desired track.

Accordingly, as track pitch narrows, the respective outputs of the BPFs are not affected by the adjacent tracks and it is possible to generate the tracking error signal TE. Also, interference from noise in other frequency bands is negligible, since the BPF outputs are used. Furthermore, since the present optical system has the same structure as a conventional optical system, the tracking error detection circuit of the instant invention can be used with an ordinary disk provided the tracking error detection circuit of the present invention is arranged to be changeable with the conventional tracking error detection circuits.

FIG. 5 is a block diagram showing another embodiment of the tracking error detection circuit according to the present invention. It is assumed that in a disk to which the present invention is applied, a carrier signal having a predetermined frequency (for example, a frequency $f_1$) has been recorded every other rotation of the disk, via multiplexing with the informaion signal. In the FIG. 5, the respective outputs of the photoelectric conversion elements 21 and 22, based on tracking sub-beams $S_A$ and $S_B$, are passed through BPFs 41 and 42, wherein each filter has a passing band corresponding to the frequency $f_1$. The filter outputs are then amplitude-detected by circuits 43 and 44, respectively. A difference in output between the amplitude detection circuits 43 and 44 is derived by a differential amplifier 46 as an error signal $f_1TE$.

On the other hand, an output of the photoelectric conversion element 23, generated from main beam $S_M$, is passed through a BPF 46 having a passing band corresponding to the frequency $f_1$, amplitude-detected by an amplitude detection circuit 47, and then supplied to a comparator 48. Comparator 48 compares this output to a predetermined reference voltage level $V_{ref}$. Next, a comparison output of the comparator 48 is supplied, as a switch control signal, to a polarity switching circuit 49 which is supplied also with the error signal $F_1TE$. The polarity of the output of the comparator 48 indicates whether or not the main beam $S_M$ is positioned on the recording track, which contains carrier signal $F_1$. Thereby, each rotation of the disk can be detected through the polarity change.

Although the above embodiment sets forth that one rotation of the disk is detected through a comparison between the reference voltage level, $V_{ref}$ and the amplitude of the carrier signal $f_1$ component read by main beam $S_M$, the present invention is not limited to this embodiment. Similarly to the first embodiment described above, it is possible that a synchronizing signal is previously recorded in every rotation of the disk, so that the synchronizing signal is detected from the output of main beam $S_M$.

Referring to a waveform diagram of FIG. 6, the circuit operation of FIG. 5 will be described hereunder.

When the main beam spot $S_M$ crosses recording tracks while moving at a constant speed in the radial direction of a disk, photoelectric conversion element 23 outputs an RF signal, generated by main beam SM, which changes as shown in FIG. 6(A). The output detection circuit 47, which represents the carrier signal $f_1$ component of the main beam SM, changes as shown in FIG. 6(B), and the error signal $f_1TE$, which represents the output of the differential amplifier 45 changes as shown in FIG. 6(C). During operation, the output of detection circuit 47 is compared with the reference level $V_{ref}$ in the comparator 48 and this comparator output is then feed to polarity switching circuit 49. This comparator controls polarity switching circuit 49, which alternates the polarity of error signal f1TE. Accordingly, a tracking error signal TE as shown in FIG. 6(E) is obtained from the output of switching circuit 49.

Tracking servo is based on the tracking error signal TE, such that it is possible to generate the tracking error signal TE to control the main beam even if a track pitch is narrow.

As described above, the tracking error detector circuit according to the present invention is arranged such that the tracking error signal is generated from the carrier signal components detected by the sub-beams. Accordingly, it is possible to generate the tracking error signal which can correctly perform tracking servo operations even when the track pitch is small.

What is claimed is:

1. A tracking error detection circuit in an apparatus for playing an information recorded disk in which carrier signals having frequencies $f_1$ and $f_2$ are alternately multiplexed, each rotation of said disk, with an information signal and recorded together onto said disk, said tracking error detection circuit comprising:

a main beam, a pair of tracking sub-beams which generate a pair of tracking outputs and are positioned to precede and succeed said main beam as said main beam moves in a radial direction relative to rotation of said disk, wherein each of said pair of tracking outputs include f1 and f2 components representing said carrier signals;

means for deriving, as a first error signal, a difference in amplitude between $f_1$ components of each tracking output, means for deriving, as a second error signal, a difference in amplitude between $f_2$ components of each tracking output, detector means for generating a detection signal each time said information-recorded disk completes a revolution; and means connected to said detector means for alternately selecting said first and second error signals each time said detector means generates a detection signal, thereby outputting the selected one of said first and second error signals as a tracking error signal.

2. The tracking error detection circuit of claim 1 wherein said detector means includes a means for comparing amplitudes between an $f_1$ *component* and $f_2$ component of an output of said main beam.

3. The tracking error detection circuit of claim 1 further comprising:

a synchronizing signal recorded on said information-recorded disk every rotation of said disk, and said detector means is constituted by a synchronization detector means for detecting said synchronizing signal from an output of said main beam.

4. A tracking error detection circuit in an apparatus for playing an information recorded disk in which a carrier signal having a predetermined frequency is superimposed, every other rotation, on an information signal and recorded together with said information signal on said disk, said tracking error detection circuit comprising:

a main beam, a pair of tracking sub-beams which generate a pair of tracking outputs and are positioned to precede and succeed said main beam as said main beam moves in a radial direction relative to rotation of said disk, wherein each of said pair of tracking outputs include a carrier signal component;

means for deriving, as an error signal, a difference in amplitude between carrier signal components included in a pair of tracking outputs, detector means for detecting each rotation of said information-recorded disk; and means connected to the detector means for switching a polarity of said error signal whenever said detector means generated an output, whereby the alternately switched error signal polarity acts as a tracking error signal.

5. The tracking error detection circuit of claim 4 wherein said detector means is constituted by a comparator means for comparing a predetermined reference level with an amplitude of said carrier signal component included in said main beam output.

6. The tracking error detector circuit of claim 4 further comprising:

a synchronizing signal recorded on said information-recorded disk every rotation of said disk, and said detector means is constituted by a synchronization detector means for detecting said synchronizing signal from said main beam output.

* * * * *